Figure 1:
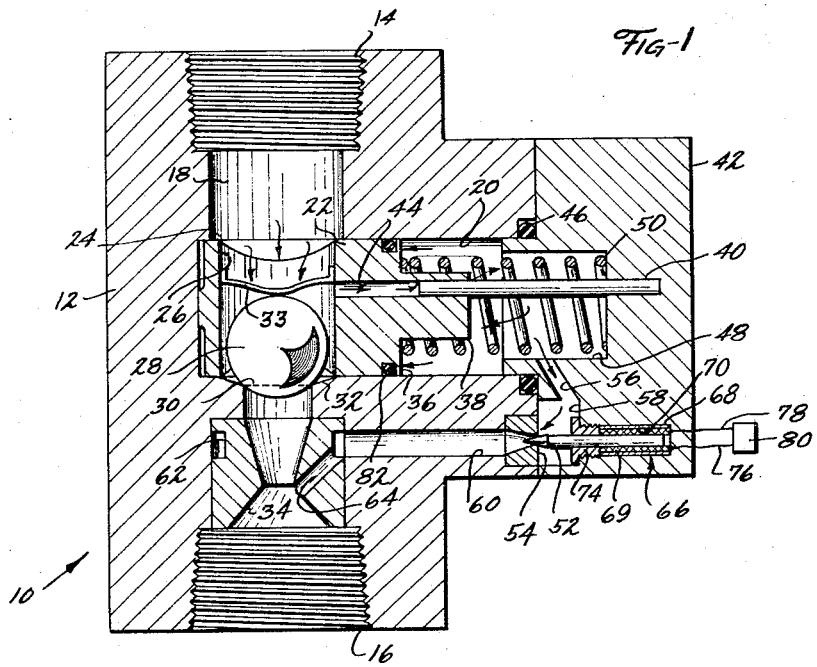

Jan. 10, 1967  A. C. HOFFMAN  3,297,297

BALL VALVE

Filed July 10, 1964

INVENTOR
ALLAN C. HOFFMAN
BY Hernig & Walsh
ATTORNEY

United States Patent Office 3,297,297
Patented Jan. 10, 1967

3,297,297
BALL VALVE
Allan C. Hoffman, 2891 Rumsey Drive,
Riverside, Calif. 92506
Filed July 10, 1964, Ser. No. 381,776
4 Claims. (Cl. 251—30)

The present invention relates to a ball valve, and more particularly to such a valve which is controlled by a directly or remotely operated pilot valve.

Although prior art ball valves are available, they do have certain disadvantages. One disadvantage resides in the fact that some valves exhibit excessive pressure drops. Another disadvantage resides in the fact that the ball usually seats rapidly, resulting in undesirable "water hammer" when the valve is used in a pressurized supply system. Yet another disadvantage resides in the fact that such valves do not readily lend themselves to remote operation, because of the high forces needed to open and close the valve.

In view of the foregoing factors and conditions characteristic of ball valves, it is a primary object of the present invention to provide a new and improved ball valve not subject to the disadvantages enumerated above and having a ball loosely caged in a piston or retainer which moves the ball out of the path of flow when it is unseated and which is actuated by line pressure to roll the ball off its seat and up an inclined plane, thereby greatly reducing the forces required to unseat the ball.

Another object of the present invention is to provide a valve of the type described which has a straight-through flow and a consequent low pressure drop.

Yet another object of the present invention is to provide a ball valve which can be closed slowly to minimize "water hammer."

A further object of the present invention is to provide a ball valve wherein the ball is efficiently and expeditiously controlled by a remotely operated pilot valve.

According to the present invention, a valve body is provided with an inlet port and an outlet port which are in alignment with each other. A piston is slidably mounted in the valve body at right angles to the ports. The piston is located between the inlet port and the outlet port and cages a spherical ball which is adapted to seat on a valve seat located downstream of the piston. The piston is prevented from turning by a fixed pin which engages a bore extending through the piston. Fluid being controlled by the valve is bled through the bore in the piston upstream of the spherical ball into a space behind the piston to add to the force applied to a compression spring biasing the piston into its position between the ports so that the ball will freely seek its own seat. Suitable passageways are provided so that the fluid existing behind the piston can be bled to a point downstream of the piston and ball. A pilot valve controls the flow through these passageways and as long as the pilot valve is closed, the ball remains seated. When the pilot valve is opened to relieve the pressure behind the piston, the piston slides away from its position between the two ports rolling the ball with it, thereby opening the valve for a straight-through flow. The pilot valve may be seated and unseated by any suitable direct or remote control means such as mechanical, electrical, hydraulic, or pneumatic means.

One of the essential significant features of the invention is the free floating valve which is able to find its own seat and is able to seal even at low pressures. Another feature is pulling the ball away from the seat transversely up an inclined plane to unseat it. This could, of course, be done in other ways by pulling it away with a wire or other means, manually or automatically, or from a remote point. Also, very little operating force is required to pull the ball away transversely from the seat to open the valve.

Conventional ball valves ordinarily have to be unseated in a direction away from the valve seat and against the active pressure, requiring a large amount of unseating force to operate the valve.

Another feature of the present invention is that by moving the ball away transversely, it does not remain in the flow path, as is the case with conventional ball valves, but rather is moved out of the way leaving an entirely open path of flow. The essential principle in this regard is the concept and idea of moving the ball transversely away from the seat leaving the flow path along the axis of the valve completely open. The opening force need be only perhaps ten to fifteen percent of the force exerted by the pressure of the fluid on the ball. This percentage is determined by the angle of the taper of the valve seat. The more flat the taper, the less opening force required. Also, by rolling the ball transversely off its seat rather than sliding it off, there is no sliding friction involved. Rolling friction is less than sliding friction so that the load imposed in moving the ball laterally off its seat is considerably less than it would be if sliding friction had to be overcome. The valve has a very broad application in the sense that it is adaptable to both very high and low pressures and very high and low temperatures.

The features of the present invention which are believed to be novel are set forth with particularity in the appended claims. The present invention, both as to its organization and manner of operation, together with further objects and advantages theerof, may best be understood by reference to the following description, taken in connection with the accompanying drawings, in which like reference characters refer to like elements in the several views.

Figure 2:
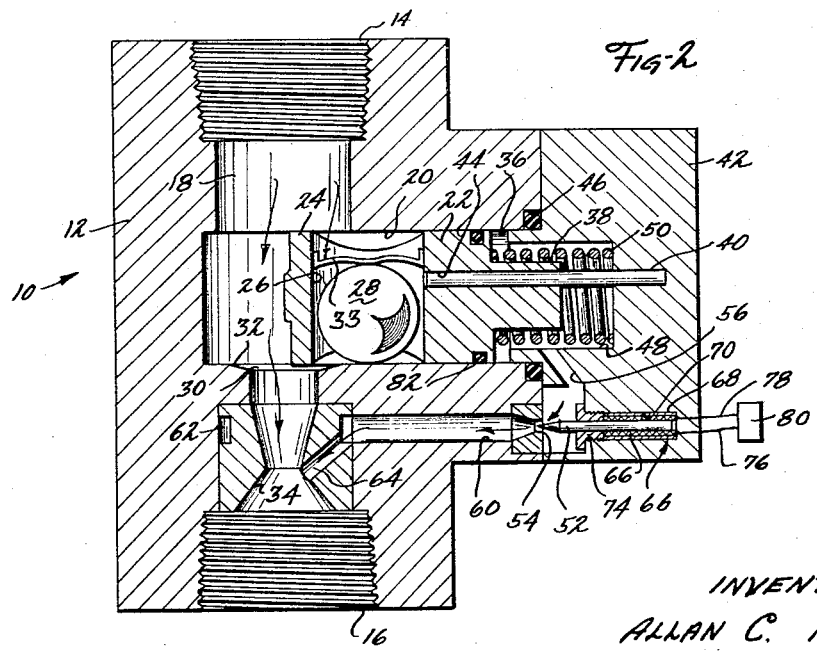

In the drawings:

FIGURE 1 is a cross-sectional view showing a valve of the present invention in a seated condition; and FIGURE 2 is a cross-sectional view of the valve of FIGURE 1 in an unseated condition.

Referring again to the drawings, a valve constituting a presently preferred embodiment of the invention, generally designated 10, includes a valve body 12 which is provided with an internally threaded inlet port 14 and an internally threaded outlet port 16. The ports 14 and 16 are in alignment with each other and are connected by a passageway 18 forming a straight-through flow path. The valve body 12 is also provided with a second passageway or piston chamber 20 which lies at right angles to the passageway 18 and intersects the passageway 18 approximately midway between the ports 14 and 16.

A piston 22 is slidably mounted in the passageway 20 and includes an upstream portion 24 which is positionable across the passageway 18 when the piston 22 is at one end of its travel, as shown in FIGURE 1. The portion 24 is provided with a transverse bore 26 forming a cage in which a spherical ball 28 is caged. The ball 28 is adapted to seat on a seat 30 which is provided in the passageway 18 downstream of the ball 28. An annular, inclined ramp 32 surrounds the seat 30 to minimize the force required to roll the ball from its seated position to the withdrawn position shown in FIGURE 2. A light leaf spring 33 is mounted transversely across bore 26 and exerts a small downward force on ball 28 to assure that it will remain seated when the valve body 12 assumes a non-vertical position. A venturi member 34 is mounted in the valve body 12 downstream in the seat 30 in fluid communication with the outlet port 16, to augment the pressure differential.

The piston 22 also includes a downstream portion 36 which carries a boss 38. The piston 22 is prevented from rotating within the passageway 20 by a fixed pin 40 which is mounted eccentrically in a closure cap 42 and engages an eccentric bore 44 extending longitudinally through the piston 22. The closure cap 42 is sealed to the body 12 by an O-ring gasket 46 and is provided with a spring recess 48 in which one end of a return compression spring 50 is seated. The other end of the compression spring 50 encompasses the boss 38 and bears against the portion 36 of piston 22 to bias it across the passageway 18. The piston 22 is prevented from unseating the ball 28 due to line pressure by bleeding some of the incoming fluid through the bore 44, past the rod 40, and into the passageway 20 and the spring recess 48. Thus, the fluid under pressure acts on the downstream portion 36 of piston 22 to assist the spring 50 in maintaining the piston 22 in its FIGURE 1 position. Pressure in the piston chamber can equalize with line pressure. The pin 40 also serves to clean the bore 44 each time the piston 22 is reciprocated. Thus, the valve 10 has the advantage that it eliminates bleed orifices which might become clogged in use.

When it is desired to unseat the ball 28, a pilot valve 52 is unseated from its seat 54 so that pressure on the downstream portion 36 of piston 22 is relieved through a first passageway 56 communicating with a chamber 58 in which the pilot valve 52 is housed. The fluid flows from chamber 58 through the valve seat 54 into a fluid passageway 60 provided in the valve body 12. The passageway 60 communicates with an annular passageway 62 provided between the venturi 34 and the valve body 12. From the annular passageway 62, the fluid is free to flow through a passageway 64 which is provided in the venturi 34 and which communicates with the outlet port 16.

The pilot valve 52 may be remotely controlled by any suitable means such as mechanical means, manual means, electric means, hydraulic means, or pneumatic means. However, the pilot valve is shown herein for purposes of illustration, but not as a limitation, as constituting the armature of a solenoid 66 having a coil housing 68. The housing 68 is retained in position in a bore 70, provided in cap 42, by means of a threaded fitting 74. A solenoid coil 69 is provided in the coil housing 68 and is connected by electrical leads 76 and 78 to a suitable source of electric current represented diagrammatically at 80. It will be recognized by those skilled in the art that a relatively small solenoid coil can be used because the needle valve motion and force is very small.

A piston ring 82 encompasses the downstream portion 36 of piston 22 to prevent fluid in passageway 18 from passing downstream of the piston 22 into the passageway 20 so that the fluid bleeding downstream of the piston 22 can be regulated by the clearance between the bore 44 and the fixed pin 40. Thus, a variable orifice effect is caused by the sliding engagement of the stationary pin in the bore 44 of the piston 22. Consequently, the stationary pin 40 and the bore 44 coact in a dual role of preventing the piston 22 from rotating and of serving as a variable orifice.

Operation of the device will be readily understood. Fluid under pressure entering the inlet port 14 when the valve is in its FIGURE 1 condition not only seats the ball 28 on valve seat 30, but also creates a force on the left hand end portion 24 of piston 22 tending to overcome the bias of spring 50 and move the piston 22 to the right, as shown in FIGURE 1, unseating the ball 28. However, the piston 22 does not move to the right because fluid under pressure bleeds through the bore 44 around pin 40 into the passageway 20 and the coil recess 48 to exert a balancing force on the downstream portion 36 of piston 22. The force exerted by the spring 50 plus the force exerted by the fluid under pressure on the downstream portion 36 is such that the force exerted by the incoming fluid under pressure on the upstream portion 24 of the piston 22 is balanced.

When it is desired to open the valve 10 for a direct through-flow from the inlet port 14 to the outlet port 16, the solenoid 66 is actuated to unseat the pilot valve 52. This permits the fluid under pressure to bleed from the downstream portion 36 through passageways 56, 54, 60, 62, and 64 into the outlet port 16. Then the fluid pressure on the upstream portion 24 of piston 22 overcomes the bias of spring 50, causing the piston 22 to move to the right, as shown in FIGURE 2. As the piston 22 moves to the right, it rolls ball 28 off of the valve seat 30, causing it to roll up ramp 32 and back into the passageway 20. As the ball 28 starts to unseat, fluid under pressure flowing from the inlet port 14 through the valve seat 30 and the venturi 34 reduces the pressure in passageways 64 and 60, causing the pressure on the downstream portion 36 of piston 22 to be relieved at an increased rate so that the piston 22 moves on to the end of its stroke to the right, completely clearing the passageway 18. This minimizes the pressure drop through the passageway 18 as the fluid flows from the inlet port 14 out through the outlet port 16. The rolling action of the ball 28 up the inclined plane 32 permits a low force to move the ball and this force is always proportional to the line pressure.

When it is desired to close the valve 10, the pilot valve 52 is seated so that fluid under pressure will again accumulate in spring recess 48 and passageway 20 to exert a balancing force against the downstream portion 36 of piston 22, causing it to begin to move to the left under the action of spring 50, as viewed in FIGURE 2. The valve 10 closes slowly because the pin 40 in the bore 44 has a dash pot action. Thus, when the valve 10 is employed in a pressurized system, "water hammer" is minimized by the slow closing of the valve 10. When the piston 22 reaches the end of its stroke to the left, as viewed in FIGURE 1, the ball will freely seat on the seat 30 closing the flow through passageway 18.

While the particular valve herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A solenoid actuated ball valve for controlling the flow of fluid under pressure, comprising:

a valve body;

a fluid inlet port provided in said valve body for admitting a fluid under pressure thereto;

a fluid outlet port provided in said valve body in alignment with said inlet port;

a fluid passageway provided in said valve body for placing said inlet port in fluid communication with said outlet port;

a piston chamber provided in said valve body at right angles to said fluid passageway and communicating therewith;

a piston slidably mounted in said piston chamber for movement into and out of said fluid passageway, said piston being provided with a transverse bore in an end part thereof, said piston being provided with a longitudinal bore offset from its longitudinal axis for placing one end of said piston in fluid communication with said downstream portion;

a fixed pin mounted in said valve body in engagement with said longitudinal bore for preventing said piston from rotating about its longitudinal axis in said piston chamber;

spring means biasing said piston into said fluid passageway;

a spherical valve means caged by said piston in said transverse bore;

a valve seat in said valve body downstream of said spherical valve means, said valve means being adapted to seat on said valve seat when said piston is disposed within said fluid passageway, said piston unseating said valve means when said piston is moved against the bias of said spring means; and means mounted in said valve body for overcoming the bias of said spring means to unseat said valve means by moving said piston out of said fluid passageway.

2. The valve of claim 1 wherein said last mentioned means includes passageway means placing one end of said piston in fluid communication with said outlet port and solenoid actuated pilot valve means mounted in said passageway means for controlling the flow of fluid therethrough.

3. A valve for controlling a flow of fluid under pressure comprising a valve body having a fluid inlet port and a fluid outlet port provided therein in fluid communication with each other; a valve seat in said valve body intermediate said ports; valve means mounted in said valve body for seating engagement with said valve seat by the force of fluid entering said inlet port when said valve means is in the flow path of said fluid; means connected to said valve means for moving it into and out of said flow path; said valve means comprising a spherical ball; said connecting means comprising a piston caging said spherical ball, said piston being slidably mounted in said valve body in such a manner that it can be slid into and out of said flow path; said piston being movable by creating a pressure differential between its ends; means for creating said pressure differential by evacuating fluid from one of said ends and passing it through passageway means communicating with said outlet port downstream of said valve seat; means comprising a solenoid actuated needle valve for controlling flow through said passageway; and means comprising a fixed pin engaging in a bore provided in said piston, said bore providing fluid communication between opposite ends of the piston.

4. A valve for controlling a flow of fluid under pressure comprising a valve body having a fluid inlet port and a fluid outlet port provided therein in fluid communication with each other, a valve seat in said valve body intermediate said ports, valve means mounted in said valve body for seating engagement with said valve seat by the force of fluid entering said inlet port when said valve means is in the flow path of said fluid, means connected to said valve means for moving it into and out of said flow path, said valve means comprising a spherical ball, said connecting means comprising a piston provided with an opening caging said spherical ball, said piston being slidably mounted in said valve body in such a manner that it can be slid into and out of said flow path, means whereby said piston is moved by creating a pressure differential between its opposite ends, said connecting means being arranged to roll the spherical ball transversely off its seat, the said means for creating a pressure differential between opposite ends of said valve comprising passageway means extending longitudinally through said piston and providing communication between the inlet side and outlet side of the said valve, and pilot valve means for controlling the passageway.

References Cited by the Examiner

UNITED STATES PATENTS

| | | | |
|---|---|---|---|
| 926,389 | 6/1909 | Collin | 251—30 X |
| 1,334,870 | 3/1920 | Lowry. | |
| 1,435,067 | 11/1922 | Hurst | 251—35 |
| 1,646,640 | 10/1927 | Daniel | 251—43 X |
| 2,629,578 | 2/1953 | Paul | 137—519.5 |
| 3,088,480 | 5/1963 | Yancey | 137—315 X |

FOREIGN PATENTS 1,369,258  6/1964  France.

M. CARY NELSON, *Primary Examiner.*

A. ROSENTHAL, *Assistant Examiner.*